Patented Mar. 14, 1944

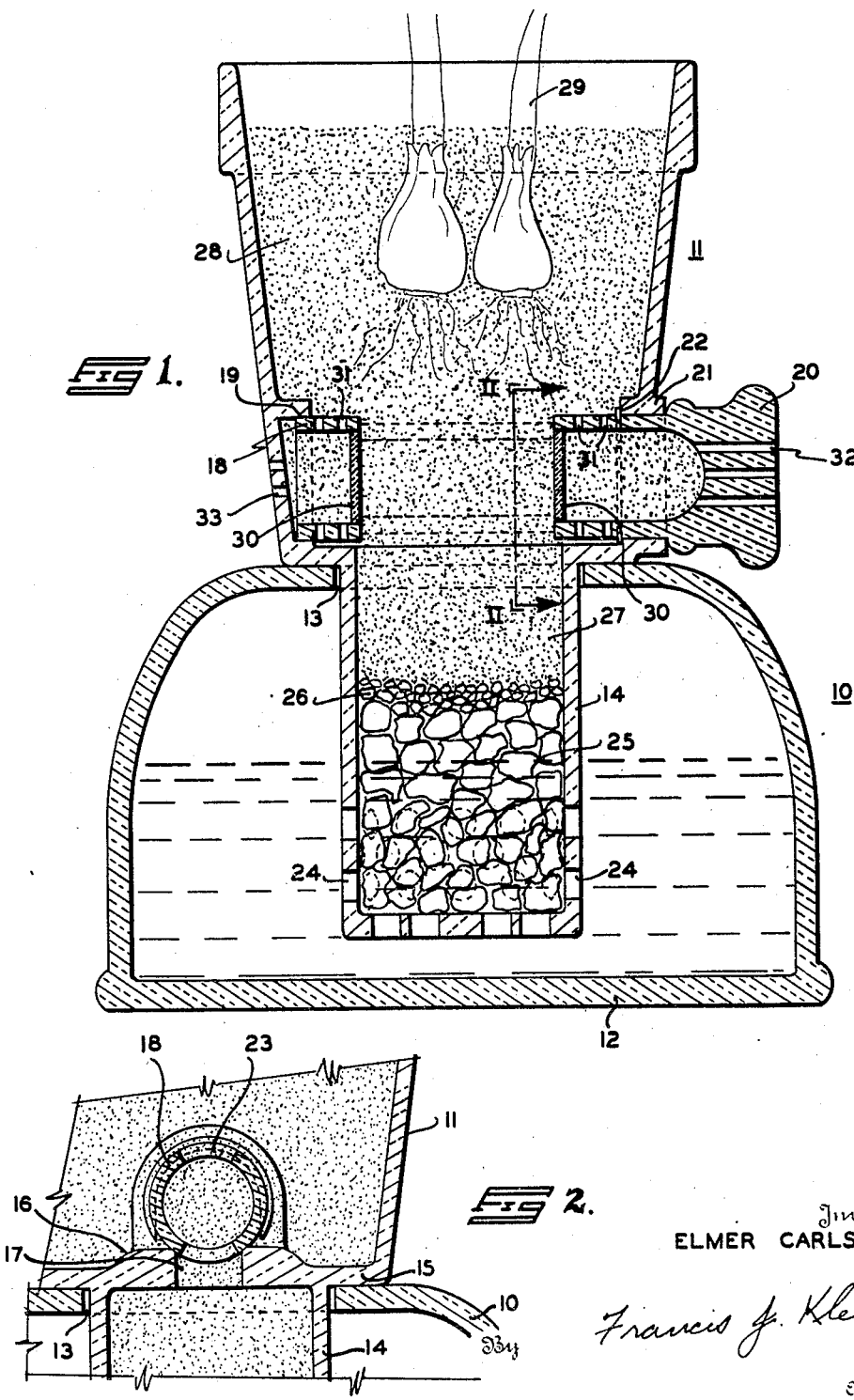

2,344,202

UNITED STATES PATENT OFFICE 2,344,202

PLANT RECEPTACLE

Elmer Carlson, East Palestine, Ohio

Application August 22, 1942, Serial No. 455,685

12 Claims. (Cl. 47—38)

This invention relates to a plant receptacle and more particularly to a receptacle of the irrigating type in which provision is made to store a body of water and to transfer water from the reservoir to about the roots of the plant as required.

The primary object of the invention is the provision of a device for the purposes indicated which incorporates therein an operative and practical arrangement for controlling the amount of moisture fed to the seeds or plants contained in the soil holder of the assembly. This is accomplished, in accordance with the preferred embodiment of the invention, by providing a valve which is located either in the soil or in a body of sand which is intermediate the seeds or plants and the water reservoir and which is so arranged in the assembly that it may be a fired clay product whereby the same may be economically produced and, in use, remain immune to corrosion or other deterioration.

Another object of the invention is the provision of a device having the characteristics above outlined which may be constructed substantially entirely of fired clay parts whereby the same may be economically produced and assembled and when in use is capable of rendering long and trouble free service.

A further object of the invention is the provision in a device of the character described of an improved arrangement for transferring moisture from the water reservoir to the soil about the seeds or the roots of plants contained in the receptacle as well as for controlling the amount of moisture transferred. Heretofore various expedients have been proposed for this purpose but as these expedients involve the use of wicks, sponges and other impractical elements, the resultant devices were unsatisfactory. The deficiencies of the prior devices are overcome by the present invention by constructing the soil container with a depending well, preferably integral, which well is adapted to extend down into a water reservoir and is filled with coarse and fine gravel and sand up through which the moisture travels by capillary action. The lower part of the well is provided with suitable inlet openings and both the soil container and the well are preferably produced of fired clay.

The above and other specific objects and advantages of the invention will become apparent from a consideration of the following detailed specification and the accompanying drawing which specifically discloses a preferred embodiment of the invention.

In the drawing:

Figure 1 is a vertical section through an assembled plant receptacle constructed in accordance with the principles of the invention; and Figure 2 is a fragmentary vertical section taken at right angles to the section plane of Figure 1 along the line II—II of Figure 1.

The receptacle of this invention is preferably constructed of two unitary principal parts, a water reservoir or container 10 and a soil and plant container. The former has a suitable bottom wall 12 which forms the support for the assembly and an opening 13 in its top wall which is complementary in outline to the horizontal periphery of the well 14 which depends downwardly from the bottom wall of the part 11.

The upper portion of the part 11 is shaped similarly to the conventional flower pot, being provided with a frusto-conical side wall, and a bottom wall 15. The latter, however, is provided with a diametrically extending thickened portion 16 in which is formed a slot or opening 17. The upper side edges of the slot 17 are concaved as indicated in Figure 2, to form a seat for the tubular controlling element or valve 18. Tubular valve 18 extends diametrically of the part 11 immediately above the bottom wall 15 and its inner end is rotatably received in a circular socket 19 integrally provided in the inner face of the circular side wall of the container 11. The outer end of valve 18 has an integral operating knob portion 20 and this end of the valve is journaled adjacent the knob. In a circular opening provided in a boss 21 also formed in the side wall of the container 11. If desired, a snap ring 22 of suitable corrosion-proof material may be inserted in an annular groove formed in the valve 18 immediately inward of the inner face of the boss 21 to prevent accidental withdrawal of the valve. It should be understood, however, that other suitable expedients may be employed to lock the valve in position, if desired.

Formed in the circular side wall of the valve 18 is a pair of diametrically spaced openings 23 which are adapted to be aligned with the opening or slot 17 in the bottom wall of the container 11 so that communication through the soil or sand contained in the parts may be effected between the water in the reservoir and the seeds or roots of plants contained in part 11. By rotating valve 18 by means of knob 20 the communication area may be decreased or increased as desired and thus the amount of moisture which is fed to the seeds or roots may be accurately controlled. Suitable indicia may be incorporated in or on the knob 20 to indicate the setting of the valve. Valve 18 including the integral knob or operator 20 is preferably formed of clay and then fired as is well understood in the pottery making art.

Likewise the parts 10 and 11 are preferably pottery products and a suitable glaze or other ornamentation may be fixed on the exposed surfaces of any of the parts during the process of manufacture thereof as is well understood in the art.

As shown in Figure 1, the bottom and side walls of the lower portion of the well 14 are provided with a plurality of inlet openings 24 and in operation the lower portion of the well is filled with gravel 25, the pieces of which are preferably of a porous and absorbent nature. Above the coarse gravel 25 is placed a layer of finer gravel 26 having similar characteristics and above the layer 26 is sand 27. Sufficient sand (or soil if of a sandy texture) is employed to fill both the upper part of the well and the hollow valve 18. The soil 28 above the valve 18 and in which the plants 29 may be growing may be of any desired character. In actual operation the indicated assemblage of material has shown itself to be effective in transferring moisture from the reservoir to the plants and, also, the valve 18 is effective in controlling the amount of moisture transferred. It should be observed that the cylindrical nature of the valve enables it to be easily rotated even though the same is embedded in sand or soil as indicated.

To provide means to allow air to reach the soil about the roots of the plant contained in the pot 11 the valve 18 is made hollow as illustrated and the walls 30 close off the spaces within the outer ends of the valve from the passageway through the slots 23 to prevent moisture from passing directly into the outer spaces of the valve. A plurality of axially and circumferentially spaced openings 31 are provided in the side wall of the valve immediately outward of the walls 30 and to allow air to reach the outer spaces of the valve openings 32 are placed in the knob 20 and openings 33 are placed in the wall of the pot 11 in alignment with the seat 19. Thus air from the outside may pass into the outer spaces of the valve structure, which spaces may or may not be filled with sand or soil, and thence through openings 31 into the coil 28 contained about the roots, bulbs or seeds in the pot 11. It is recognized that such aeration greatly facilitates the development and speed of plant growth.

The above specifically described embodiment of the invention should be considered as illustrative only as obviously many changes may be made therein without departing from the spirit or scope of the invention. The shape and outward appearance of the individual parts as well as the whole may, obviously, be varied as desired. Various modifications, including those of a structural nature, become readily apparent and reference should therefore be had to the appended claims in determining the scope of the invention.

What I claim is:

1. An irrigating plant receptacle comprising in combination a water reservoir, a soil and plant container having a lower portion extending into said reservoir, water inlet openings in the bottom part of said lower portion, and means to vary the effective intercommunication area between the upper and lower portions of said container.

2. A device according to claim 1 further characterized in that said means comprises a fired clay valve.

3. A device according to claim 1 further characterized in that said reservoir and said container are fired clay products, and said means comprises a fired clay valve.

4. A valve for controlling the moisture transfer in a self irrigating plant receptacle comprising a cylindrical fired clay body having a diametrically extending opening therethrough and an integral operating knob at one end thereof.

5. A valve according to claim 4 further including air receiving pockets axially outwardly of said opening, means to conduct air axially inwardly into said pockets, the side walls of said pockets having circumferentially spaced apertures therethrough.

6. An irrigating plant receptacle comprising in combination a lower container adapted to retain a body of water and having an opening at its top, an upper container adapted to receive a quantity of soil and having a reduced depending portion received within said opening and extending down into said water, the lower part of said depending portion having openings therethrough, a horizontal wall between the body of said upper container and said depending portion, said wall having an opening therethrough providing communication between said body and said portion, and means to vary the effective area of said opening through said wall.

7. An irrigating plant receptacle comprising in combination a lower container adapted to retain a body of water and having an opening at its top, an upper container adapted to receive a quantity of soil and having a reduced depending portion received within said opening and extending down into said water, the lower part of said depending portion having openings therethrough, a horizontal wall at the upper end of said reduced portion, said wall having an opening therethrough, a semi-cylindrical seat in the upper surface of said wall and encompassing the upper end of said opening, and a rotary cylindrical valve lying in said seat and having a diametrically extending opening therethrough whereby the effective area of said opening through said wall may be controlled as desired.

8. An irrigating plant receptacle comprising in combination a lower container adapted to retain a body of water and having an opening at its top, an upper container adapted to receive a quantity of soil and having a reduced depending portion received within said opening and extending down into said water, the lower part of said depending portion having openings therethrough, and means to vary the effective intercommunication area between the principal body portion of said upper container and the space within said reduced portion.

9. An irrigating plant receptacle comprising in combination a clay container adapted to retain a body of water and having an opening in its top wall, an upper clay container having a reduced portion extending down through said opening, said reduced portion having water inlet openings in its lower part, and a clay valve intermediate the principal body portion of said upper container and the space within the reduced portion thereof whereby the effective intercommunication area between said body portion and said space may be varied.

10. An irrigating plant receptacle comprising in combination a clay container adapted to retain a body of water and having an opening in its top wall, an upper clay container having a reduced portion extending down through said opening, said reduced portion having water inlet openings in its lower part and a horizontal clay wall intermediate the principal body portion of said upper container and the space within said reduced portion, said horizontal wall having an opening therethrough, a semi-cylindrical seat in the upper surface of said last mentioned wall encompassing the upper end of said last mentioned opening, and a rotary cylindrical clay valve having a diametrically extending opening therethrough lying in said seat and journaled in the side walls of the principal body portion of said upper container.

11. An irrigating plant receptacle comprising in combination a water reservoir, a soil and plant container having a lower portion extending into said reservoir, the bottom part of said lower portion being provided with water inlet openings and filled with coarse gravel, sand-like substance in said lower portion above said gravel, and means to vary the effective intercommunication area between the upper and lower portions of said container.

12. An irrigated and ventilated plant receptacle comprising in combination a lower container adapted to retain a body of water and having an opening at its top, an upper container adapted to receive a quantity of soil and having a depending well to extend down through said opening and into the water contained in said lower container, a plurality of openings in the lower portions of the walls of said well, openings through the side wall of said upper container adjacent the lower portion thereof to allow air to enter the soil contained therein, and means to vary the effective intercommunication area between the upper container and the space within the well depending therefrom.

ELMER CARLSON.